US010291550B2

United States Patent
Chen

(10) Patent No.: US 10,291,550 B2
(45) Date of Patent: May 14, 2019

(54) BRIDGING BASED UPON MEDIA ACCESS CONTROL ADDRESS

(71) Applicant: ARRIS Enterprises, Inc., Suwanee, GA (US)

(72) Inventor: Jianxiang Chen, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 71 days.

(21) Appl. No.: 14/865,154

(22) Filed: Sep. 25, 2015

(65) Prior Publication Data

US 2016/0094488 A1    Mar. 31, 2016

Related U.S. Application Data

(60) Provisional application No. 62/057,614, filed on Sep. 30, 2014.

(51) Int. Cl.
| | |
|---|---|
| *H04L 12/947* | (2013.01) |
| *H04L 12/721* | (2013.01) |
| *H04L 12/28* | (2006.01) |
| *H04L 12/66* | (2006.01) |
| *H04L 12/46* | (2006.01) |

(Continued)

(52) U.S. Cl.
CPC .......... *H04L 49/25* (2013.01); *H04L 12/2898* (2013.01); *H04L 12/4625* (2013.01); *H04L 12/6418* (2013.01); *H04L 12/66* (2013.01); *H04L 45/66* (2013.01); *H04L 61/2015* (2013.01); *H04L 61/256* (2013.01); *H04L 61/2514* (2013.01); *H04L 61/6022* (2013.01)

(58) Field of Classification Search
CPC .. H04L 49/25; H04L 12/2898; H04L 12/4625
USPC ......................................................... 370/328
See application file for complete search history.

(56) References Cited

U.S. PATENT DOCUMENTS 6,256,314 B1 *  7/2001  Rodrig ................. H04L 49/602
                                                       370/401
2002/0026528 A1   2/2002  Lo
(Continued)

OTHER PUBLICATIONS

PCT Search Report & Written Opinion, Re: Application No. PCT/US2015/052179, dated Dec. 15, 2015.
(Continued)

*Primary Examiner* — Noel R Beharry
*Assistant Examiner* — Pamit Kaur
(74) *Attorney, Agent, or Firm* — Bart A. Perkins

(57) ABSTRACT

Methods, systems, and computer readable media can be operable to facilitate packet bridging based upon a host device address. An access point may identify a source or destination address associated with a received packet, wherein the address identifies an associated host device. When the destination address of a downstream data packet matches an address associated with the access point, the access point may route the packet to a destination within a local area network (LAN). When the source address of an upstream data packet identifies a host device for which communications are to be bridged, the access point may bridge the data packet to a wide area network (WAN). An access point may identify a multicast or broadcast downstream data packet and the access point may flood the packet to both a route and a bridge routine. The bridging determination may be made by a dual-layer WAN or LAN interface.

14 Claims, 5 Drawing Sheets

(51) Int. Cl.
*H04L 12/64* (2006.01)
*H04L 29/12* (2006.01)

(56) References Cited

U.S. PATENT DOCUMENTS

| | | | | |
|---|---|---|---|---|
| 2004/0114589 A1* | 6/2004 | Alfieri | ............... | H04L 29/06 370/389 |
| 2005/0114648 A1* | 5/2005 | Akundi | ............. | H04L 45/308 713/153 |
| 2010/0054250 A1* | 3/2010 | Kitamura | ......... | H04L 12/2818 370/392 |
| 2011/0030032 A1* | 2/2011 | Baykal | ............ | H04L 29/12264 726/3 |
| 2011/0134925 A1* | 6/2011 | Safrai | .............. | H04L 49/35 370/395.53 |
| 2013/0201979 A1* | 8/2013 | Iyer | ................. | H04W 84/12 370/338 |

OTHER PUBLICATIONS

B. Hill, "Cisco: The Complete Reference—Chapter 20, Layer 3 Switching", retrieved from the Internet on Mar. 31, 2005 at <http://web10.eppg.com/betabooks/nov01/hill/ch20.html>.

\* cited by examiner

US 10,291,550 B2

BRIDGING BASED UPON MEDIA ACCESS CONTROL ADDRESS

CROSS REFERENCE TO RELATED APPLICATION

This application is a non-provisional application claiming the benefit of U.S. Provisional Application Ser. No. 62/057,614, entitled "Bridging Identified Device in Gateway Using Media Access Control Address," which was filed on Sep. 30, 2014, and is incorporated herein by reference in its entirety.

TECHNICAL FIELD

This disclosure relates to packet bridging based upon a media access control address.

BACKGROUND

Typically, one or more services (e.g., voice, video, data, etc.) are provided to a subscriber from a multiple systems operator (MSO). The one or more services are generally delivered to a central device or access point (e.g., modem, router, gateway, etc.) located within a subscriber premise, and the central device or access point forwards the services to one or more client devices (i.e., host devices). A central device or access point typically operates in a NAT (Network Address Translation) route mode to route communications through the device and onto a targeted client or host device. For example, using an embedded modem, the central device or access point will usually route communications from a wide area network (WAN) (e.g., cable, digital subscriber line (DSL), fiber, etc.) to a local area network (LAN) (e.g., Ethernet, Wi-Fi, multimedia over coax alliance (MoCA), etc.). NAT allows private internal Internet protocol (IP) addresses (i.e., LAN hosts) to be mapped to a single external IP address (e.g., WAN address of the central device/access point). A central device/access point will typically run a DHCP (Dynamic Host Configuration Protocol) server application on a LAN side to assign private IP address to LAN hosts (e.g., client devices).

This home network deployment has the side effect of hiding the internal hosts, and a WAN side DHCP server is left without the ability to allocate an address to a specific LAN device (e.g., STB (Set Top Box), ATA (Analog Telephone Adaptor), etc.) directly. Thus, all the data traffic has to be routed at Internet layer (Layer 3, IP layer) by the central device/access point.

In some instances, a central device/access point may be placed in a full bridge mode. For example, in order to access a LAN host, some firewall rules like demilitarized zone (DMZ) or port forwarding may be configured in the central device/access point. However, for DMZ, only one host can be configured, and for Port Forwarding, knowledge of the application port numbers is required. These problems may be solved by placing the central device/access point into a full bridge mode, but the central device/access point will lose the ability to route packets while operating in full bridge mode.

At times, it may be desirable to put one or more specific devices to work under a bridge mode. For example, an operator may want to give specific DHCP options to certain STBs situated behind a central device/access point. Individual devices (e.g., individual STBs) may be identified by a unique address. For example, a media access control (MAC) address may be identified from the first 3 bytes of a data packet (e.g., OUI (Organizationally Unique Identifier)) which identifies device vendor information.

It is possible for a central device/access point to bridge an individual Ethernet port, or bridge the active port according to the DHCP message content received from a LAN host (e.g., DHCP option 43 or option 60 can identify the client's vender information), but these solutions have various limitations and inconveniences. In order to bridge one specific port, the port must be identified and labeled on the box. Moreover, the port may go unused where a user does not need a dedicated bridged port. Dynamic bridging based on DHCP options requires the addition of an extra application process to inspect the DHCP message, which can introduce a risk of being attacked by a fake host to alter the DHCP option. Further an additional switch or hub connected to the central device/access point may cause an issue by unexpectedly bridging multiple hosts. Therefore, a need exists for improving upon methods and systems for bridging data packets received at a central device/access point.

BRIEF DESCRIPTION OF THE DRAWINGS

Like reference numbers and designations in the various drawings indicate like elements.

DETAILED DESCRIPTION

Figure 1:
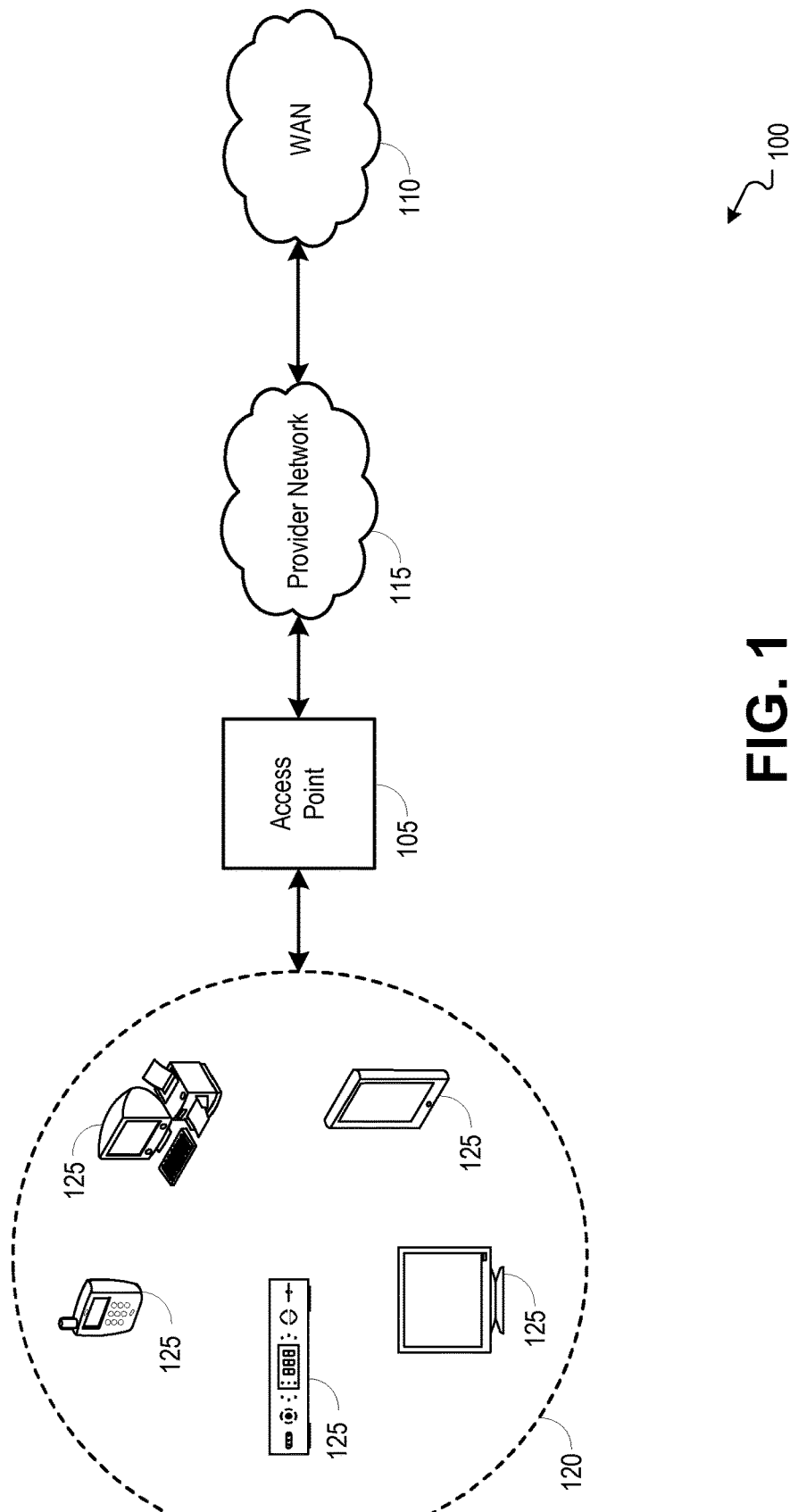
FIG. 1 is a block diagram illustrating an example network environment operable to facilitate data packet bridging based upon a device address.

It is desirable to improve upon methods and systems for bridging data packets received at an access point. Methods, systems, and computer readable media can be operable to facilitate packet bridging based upon a host device address. An access point may identify a source or destination address associated with a received packet, wherein the address identifies an associated host device. When the destination address of a downstream data packet matches an address associated with the access point, the access point may route the packet to a destination within a local area network (LAN). When the source address of an upstream data packet identifies a host device for which communications are to be bridged, the access point may bridge the data packet to a wide area network (WAN). An access point may identify a multicast or broadcast downstream data packet and the access point may flood the packet to both a route and a bridge routine. The bridging determination may be made by a dual-layer WAN or LAN interface.

An embodiment of the invention described herein may include a method comprising: (a) receiving a downstream data packet at a first interface of an access point; (b) identifying a destination address from the downstream data packet, wherein the destination address identifies a destination of the downstream data packet; (c) comparing the destination address to an address associated with the first interface of the access point; and (d) selectively bridging the downstream data packet from the first interface of the access point to a second interface of the access point based upon the comparison between the destination address and the address associated with the first interface of the access point.

According to an embodiment of the invention, the method described herein further comprises: (a) if the destination address matches the address associated with the first interface of the access point, routing the downstream data packet from the first interface of the access point to the second interface of the access point; and (b) if the destination address does not match the address associated with the first interface of the access point, bridging the downstream data packet from the first interface of the access point to the second interface of the access point.

According to an embodiment of the invention, the method described herein further comprises: (a) based on the identified destination address, determining that the downstream data packet is associated with a plurality of destinations; (b) replicating the downstream data packet to create a replicate data packet; (c) bridging the replicate data packet from the first interface of the access point to the second interface of the access point; and (d) routing the downstream data packet from the first interface of the access point to the second interface of the access point.

According to an embodiment of the invention, bridging the downstream data packet comprises passing the downstream data packet from the first interface of the access point to the second interface of the access point without translating a destination address associated with the downstream data packet.

According to an embodiment of the invention, the address associated with the first interface of the access point comprises a media access control (MAC) address.

According to an embodiment of the invention, the destination address comprises a media access control (MAC) address associated with the destination of the downstream data packet.

According to an embodiment of the invention, the first interface comprises a link layer interface and a network layer interface.

An embodiment of the invention described herein may include a method comprising: (a) receiving an upstream data packet at a first interface of an access point; (b) identifying a source address from the upstream data packet, wherein the source address identifies a host device from which the upstream data packet is output; (c) comparing the source address to one or more bridging addresses, wherein each respective one of the one or more bridging addresses comprises an address associated with a device for which packet bridging is enabled; and (d) if the source address matches at least one of the bridging addresses, bridging the upstream data packet from the first interface of the access point to a second interface of the access point.

According to an embodiment of the invention, the method described herein further comprises, if the source address does not match at least one of the bridging addresses, routing the upstream data packet from the first interface of the access point to the second interface of the access point.

According to an embodiment of the invention, routing the upstream data packet comprises modifying network address information of the upstream data packet by replacing an Internet protocol (IP) address associated with the host device with an IP address associated with the access point.

According to an embodiment of the invention, each respective one of the one or more bridging addresses comprises a media access control (MAC) address associated with a device for which packet bridging is enabled.

According to an embodiment of the invention, the source address comprises a media access control (MAC) address associated with the host device from which the upstream data packet is output.

According to an embodiment of the invention, the first interface comprises a link layer interface and a network layer interface.

An embodiment of the invention described herein may include an apparatus comprising: (a) a first interface configured to be used to receive a downstream data packet; and (b) a second interface configured to be used to receive an upstream data packet; (c) wherein the first interface is further configured to be used to: (i) identify a destination address from the downstream data packet, wherein the destination address identifies a destination of the downstream data packet; (ii) compare the destination address to an address associated with the first interface; (iii) route the downstream data packet to a second interface if the destination address matches the address associated with the first interface; and (iv) bridge the downstream data packet to a second interface if the destination address does not match the address associated with the first interface; and (d) wherein the second interface is further configured to be used to: (i) identify a source address from the upstream data packet, wherein the source address identifies a host device from which the upstream data packet is output; (ii) compare the source address to one or more bridging addresses, wherein each respective one of the one or more bridging addresses comprises an address associated with a device for which packet bridging is enabled; (iii) bridge the upstream data packet to the first interface if the source address matches at least one of the bridging addresses; and (iv) route the upstream data packet to the first interface if the source address does not match at least one of the bridging addresses.

According to an embodiment of the invention, the address associated with the first interface comprises a media access control (MAC) address.

According to an embodiment of the invention, the destination address comprises a media access control (MAC) address associated with the destination of the downstream data packet.

According to an embodiment of the invention, the first interface comprises a wide area network (WAN) interface and the second interface comprises a local area network (LAN) interface.

According to an embodiment of the invention, each respective one of the one or more bridging addresses comprises a media access control (MAC) address associated with a device for which packet bridging at the access point is enabled.

According to an embodiment of the invention, the source address comprises a media access control (MAC) address associated with the host device from which the upstream data packet is output.

According to an embodiment of the invention, each respective one of the first interface and the second interface comprises a link layer interface and a network layer interface.

FIG. 1 is a block diagram illustrating an example network environment 100 operable to facilitate data packet bridging based upon a device address. In embodiments, an access point 105 may provide video, audio and/or data services to a subscriber by communicating with a wide area network (WAN) 110 through a connection to a provider network 115

(e.g., hybrid fiber-coaxial network, fiber network, cellular network, high speed data network, etc.). The access point 105 may include a gateway device (e.g., media gateway device), a broadband modem, a router, a wireless router including an embedded modem, a hotspot router, a wireless extender, or any other device operable to route communications between one or more client or host devices and a network. The access point 105 may provide a local network 120 for delivering services to one or more client or host devices (e.g., a local area network (LAN), a wireless local area network (WLAN), a personal area network (PAN), etc.).

A subscriber can request, receive and interact with multimedia and/or data services through a host device 125. A host device may include a set-top box (STB), computer, mobile device, tablet, television, and any other device operable to receive voice, multimedia, and/or data services from an access point 105. For example, data streams and media streams may be output from an access point 105 to one or more host devices 125 over one or more wired (e.g., Ethernet) or wireless interfaces (e.g., Wi-Fi interface).

In embodiments, the access point 105 may route or may bridge upstream and downstream communications between the WAN 110 and local network 120. For example, a WAN/LAN interface at the access point 105 may be configured to operate as dual-layer interface which can route layer 3 Internet protocol (IP) packets and bridge layer 2 data frames simultaneously. The access point 105 may determine whether to bridge or to route a received data packet based upon the destination address or the source address of the received data packet. For example, the access point 105 may bridge (e.g., layer 2 bridging) packets that are destined for or are received from certain, predetermined host devices 125, and the access point 105 may route (e.g., by applying network address translation (NAT) on an address of the packet) other data packets simultaneously. Bridged packets may be bridged directly between the local network 120 and WAN 110.

In embodiments, the access point 105 may include a virtual bridge to bridge a WAN interface of the access point 105 and a LAN interface of the access point 105 together, and the routing operations of the access point 105 may be maintained. It may be predetermined for data packets delivered to and output from one or more host devices 125 to be bridged. For example, a unique address (e.g., media access control (MAC) address) associated with the one or more host devices 125 may be stored as bridging entries at the access point 105. When the access point 105 receives a downstream packet having a destination address matching a bridging entry or an upstream packet having a source address matching a bridging entry, the access point 105 can make the determination to bridge the received packet. The access point 105 may make the determination to route all packets received that do not have a source/destination address that can be found as a bridging entry. Routing all packets not having a bridging entry address may be a default rule configured at the access point 105. It should be understood that a host device 125 for which packets are to be bridged may be connected to an access point 105 through any one of a plurality of Ethernet ports or wireless channels or service sets offered by the access point 105.

In embodiments, the decision whether to bridge or to route a received upstream data packet may be based upon the source address associated with the data packet. For example, if the source address (e.g., media access control (MAC) address) of the data packet matches an address found in a bridging entry list, the access point 105 may layer 2 bridge the received data packet. Otherwise, the access point 105 may route the upstream data packet. Routing the upstream data packet may include translating (e.g., using NAT) the source IP address of the data packet from the IP address assigned to the host device 125 to the IP address associated with a WAN interface of the access point 105.

In embodiments, the decision whether to bridge or to route a received downstream data packet may be based upon the destination address (e.g., MAC address) associated with the data packet. In embodiments, the access point 105 may be configured with an address (e.g., MAC address, IP address, etc.) that uniquely identifies the access point 105. When a downstream data packet includes a destination address matching the address associated with the access point 105, the access point 105 may route the data packet, and when a downstream data packet includes a destination address that does not match the address associated with the access point 105, the access point 105 may bridge the data packet.

In embodiments, the destination address of a downstream data packet (or one or more other bits carried by the data packet) may indicate whether the downstream data packet is a unicast, multicast, or broadcast packet. For example, the downstream data packet may be identified as a unicast packet when the destination address of the packet is a unique MAC address associated with a host device 125. The downstream data packet may be identified as a broadcast packet when the destination address includes a generic identifier of a broadcast packet (e.g., the packet contains all binary is as the destination address). The downstream data packet may be identified as a multicast packet when the destination address includes a unique multicast MAC address associated with a specific application, protocol, or data stream.

In embodiments, when the access point 105 identifies a received downstream data packet as a multicast or broadcast packet, the access point 105 may replicate the downstream data packet, set the original downstream data packet to be routed, and set the replicated data packet to be bridged.

Figure 2:
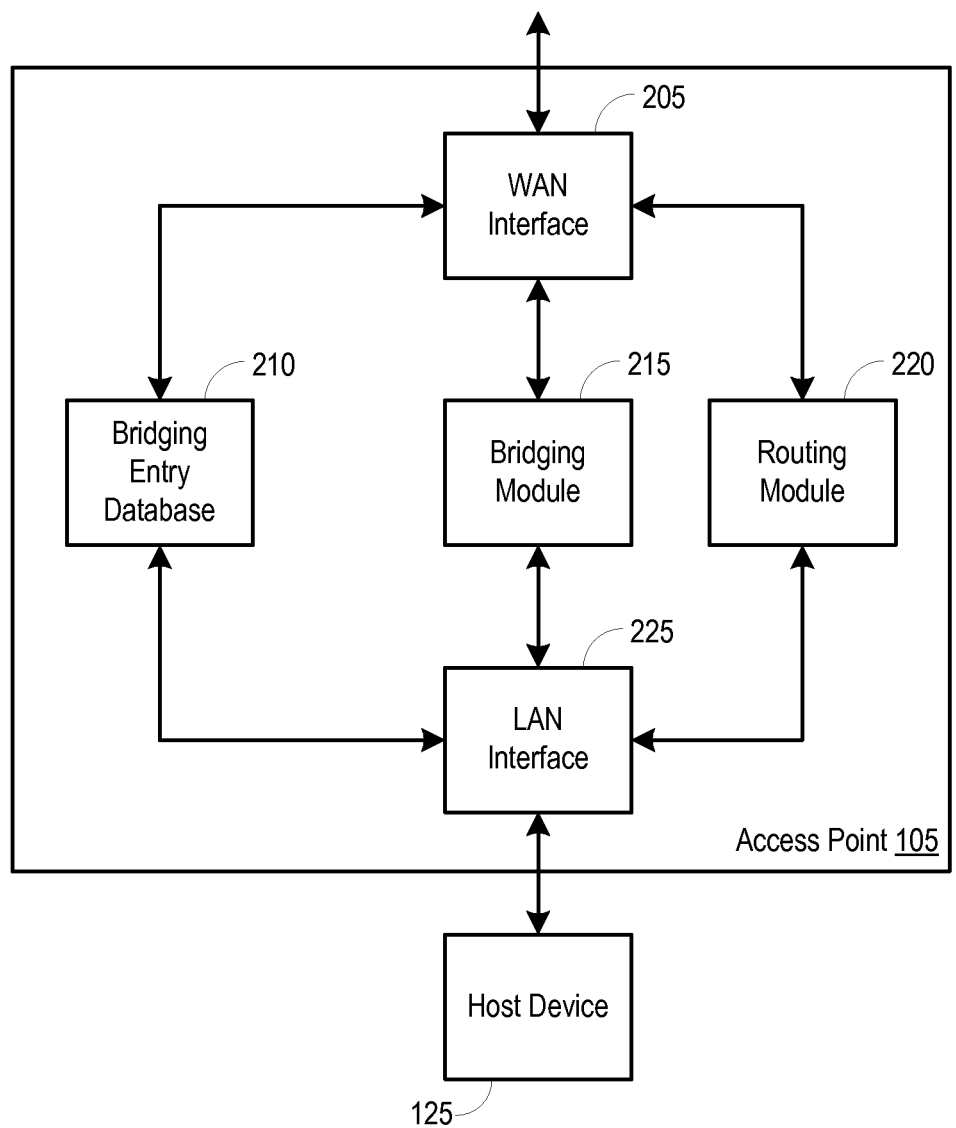
FIG. 2 is a block diagram illustrating an example access point operable to facilitate packet bridging based upon a device address.

FIG. 2 is a block diagram illustrating an example access point 105 operable to facilitate packet bridging based upon a device address. The access point 105 may include a wide area network (WAN) interface 205, a bridging entry database 210, a bridging module 215, a routing module 220, and a local area network (LAN) interface 225.

In embodiments, the access point 105 may output communications to and receive communications from an upstream device through the WAN interface 205. For example, downstream data packets associated with a service delivered to the access point 105 (e.g., voice, data, video, etc.) may be received at the WAN interface 205 from a WAN 110 of FIG. 1 via a connection to a provider network 115 of FIG. 1. Upstream data packets (e.g., requests, voice, video, data, etc.) received from a host device 125 may be output through the WAN interface 205 to a WAN 110. The WAN interface 205 may be a modem registered network device. The WAN interface 205 may be a dual-layer interface that may operate as both a network interface (e.g., layer 3 network device) and link interface (e.g., layer 2 network device) simultaneously.

The WAN interface 205 may identify a destination address included within a downstream data packet, wherein the destination address identifies a target or destination of the data packet. For example, the downstream data packet may include a MAC address associated with the host device 125 to which the packet is to be delivered or may include a MAC address associated with the access point 105. In embodiments, the destination address (or one or more other bits carried by the data packet) may indicate whether the downstream data packet is a unicast, multicast, or broadcast packet. For example, the downstream data packet may be identified as a unicast packet when the destination address of the packet is a unique MAC address associated with a host device 125 or access point 105. The downstream data packet may be identified as a broadcast packet when the destination address includes a generic identifier of a broadcast packet (e.g., the packet contains all binary 1s as the destination address). The downstream data packet may be identified as a multicast packet when the destination address includes a unique multicast MAC address associated with a specific application, protocol, or data stream.

In embodiments, when the WAN interface 205 identifies a received downstream data packet as a multicast or broadcast packet, the WAN interface 205 may cause the data packet to be replicated and processed for output through both a routing and a bridging routine. For example, the WAN interface 205 may replicate the downstream data packet, set the original downstream data packet to be routed, and set the replicated data packet to be bridged. The packet set to be bridged may be processed by the bridging module 215 and the packet set to be routed may be processed by the routing module 220.

In embodiments, the WAN interface 205 may be configured with an address (e.g., MAC address, IP address, etc.) that uniquely identifies the WAN interface 205. When the WAN interface 205 receives a downstream data packet that includes a destination address matching the address associated with the WAN interface 205, the WAN interface 205 may set the data packet for routing. For example, the WAN interface 205 may pass the downstream data packet through a routing module 220. When the WAN interface 205 receives a data packet that includes a destination address that does not match the address associated with the WAN interface 205, the WAN interface 205 may set the data packet for bridging. For example, when the WAN interface 205 receives a downstream data packet having a unicast destination address (e.g., MAC address) associated with a host device 125 or virtual local area network (VLAN), the WAN interface 205 may pass the downstream data packet through a bridging module 215.

In embodiments, the bridging module 215 may include a bridge through which a downstream packet may be passed from the WAN interface 205 to the LAN interface 225 and an upstream data packet may be passed from the LAN interface 225 to the WAN interface 205. A downstream or upstream data packet may be passed through the bridging module 215 at the link layer (e.g., layer 2) without translating a source or destination address. The bridged data packet may be passed to a host device 125 with a public IP address.

In embodiments, the routing module 220 may route downstream packets from the WAN interface 205 to the LAN interface 225 and may route upstream packets from the LAN interface 225 to the WAN interface 205. A data packet may be routed through the routing module 220 at the network layer (e.g., layer 3, IP). The routing module 220 may include address translating logic and may translate a source or destination address of a received data packet into a source or destination address associated with the access point 105. For example, the routing module 220 may apply network address translation (NAT) to a received upstream or downstream data packet. Routing of a packet may include a translation of the destination IP address of the packet from an IP address associated with the WAN interface 205 to an IP address associated with the targeted host device 125 (e.g., private IP address). For example, the routing module 220 may translate the IP address of the packet by utilizing a NAT table.

The access point 105 may transmit communications to and receive communications from one or more host devices 125 through the LAN interface 225. Downstream data packets may be bridged or routed from the WAN interface 205 to the LAN interface 225. In embodiments, the LAN interface 225 may receive requests from and may output communications (e.g., data packets) to one or more host devices 125 over a LAN (e.g., Ethernet network, wireless network, multimedia over coax alliance (MoCA) network, etc.).

In embodiments, the LAN interface 225 may receive an upstream data packet from a host device 125, and the upstream data packet may include a source address (e.g., MAC address) identifying the host device 125 from which the data packet was output. The LAN interface 225 may compare the source address of the received data packet to one or more addresses stored at the bridging entry database 210. The bridging entry database 210 may include one or more addresses (e.g., MAC addresses) associated with host device(s) 125 for which upstream communications are to be bridged from the LAN interface 225 to the WAN interface 205. The bridging entry database 210 may include additional details associated with a host device 125 such as a current status of the host device 125 (e.g., whether bridging is enabled/disabled for the device), a unique name of the host device, and others. If the LAN interface 225 matches the source address of a received packet to an address stored at the bridging entry database 210, then the LAN interface 225 may set the data packet to be bridged and may cause the data packet to be processed through the bridging module 215. If the LAN interface 225 does not match the source address of the received packet to an address stored at the bridging entry database 210, then the LAN interface 225 may set the data packet to be routed and may cause the data packet to be processed through the routing module 220.

It should be understood that the LAN interface 225 may include various types of interfaces. For example, the LAN interface 225 may include a wireless interface and/or an Ethernet interface (e.g., Gigabit Medium Independent Interface (GMII)) port connected via a main port to an external switch (e.g., a switch including a plurality of external ports) that may be used for connecting one or more host devices 125 to the access point 105.

In embodiments, the LAN interface 225 may include an Internet interface (e.g., layer 3 network device that has an IP address) and/or a link interface (e.g., layer 2 network device that does not have an IP address). A bridge may be used to bridge traffic between the link interface and the WAN interface 205. The LAN interface 225 may be a dual-layer interface.

Figure 3:
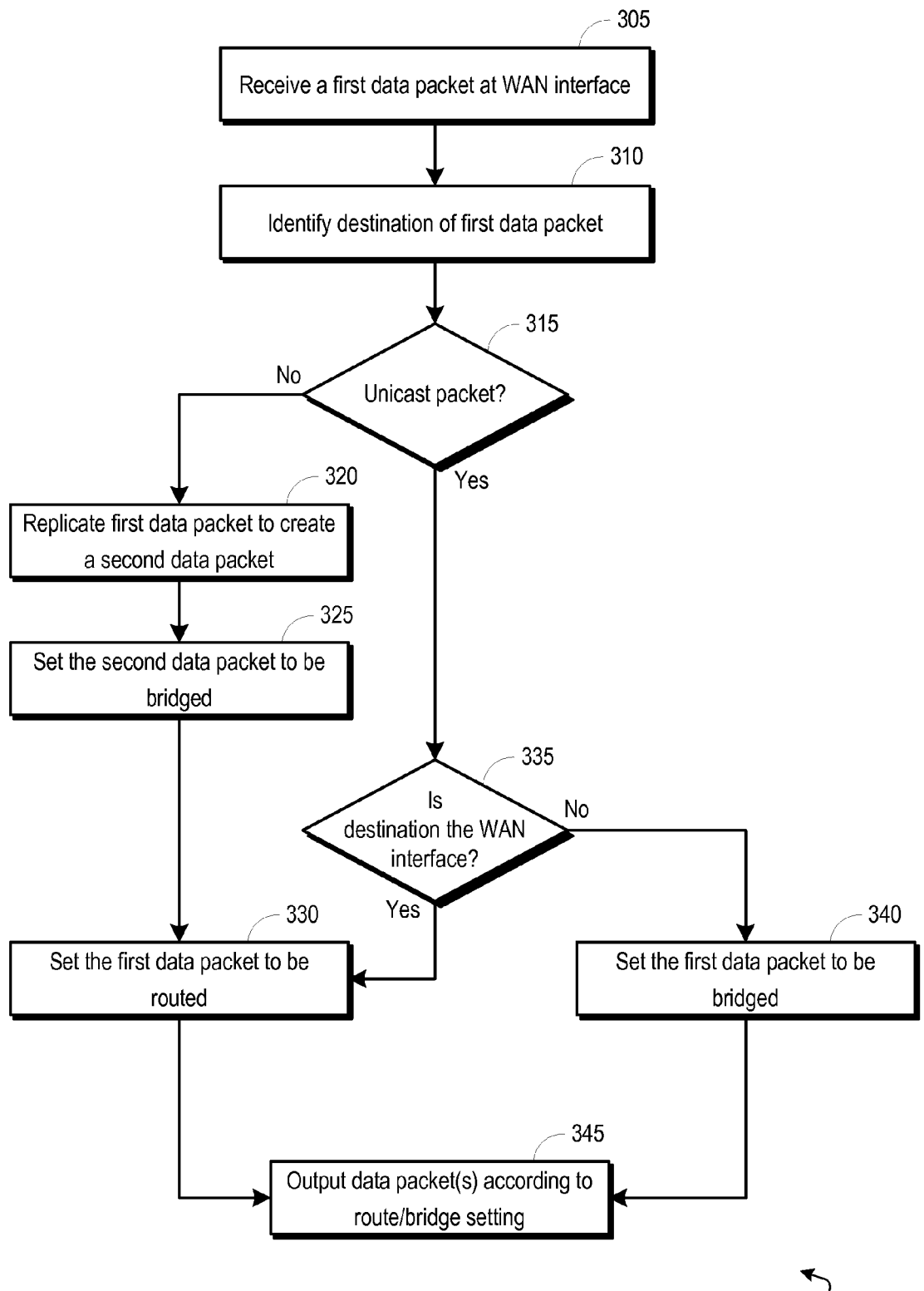
FIG. 3 is a flowchart illustrating an example process operable to facilitate bridging of downstream data packets based upon an identification of a packet destination.

FIG. 3 is a flowchart illustrating an example process 300 operable to facilitate bridging of downstream data packets based upon an identification of a packet destination. The process 300 may begin at 305 when a first data packet is received at a wide area network (WAN) interface. The first data packet may be a downstream data packet received by a WAN interface 205 of FIG. 2 of an access point 105 of FIG. 1. For example, the first data packet may be received at an access point 105 from a WAN 110 of FIG. 1 via a provider network 115 of FIG. 1.

At 310, a destination of the first data packet may be identified. The destination of the first data packet may be identified, for example, by the WAN interface 205. In embodiments, the first data packet may include an address associated with a destination (e.g., address associated with a host device 125 of FIG. 1 to which the packet is being delivered). The address may be a media access control (MAC) address associated with a host device 125 that is configured to communicate through the access point 105.

At 315, a determination may be made whether the first data packet is a unicast packet. The determination whether the first data packet is a unicast packet may be made, for example, by the WAN interface 205. In embodiments, the determination whether the first data packet is unicast may be based upon an identification of a destination address (e.g., MAC address) included within the first data packet. For example, the first data packet may be identified as a unicast packet when the destination address of the packet is a unique MAC address associated with a host device 125 or access point 105. The first data packet may be identified as a broadcast packet when the destination address includes a generic identifier of a broadcast packet (e.g., the packet contains all binary 1s as the destination address). The first data packet may be identified as a multicast packet when the destination address includes a unique multicast MAC address associated with a specific application, protocol, or data stream. In embodiments, the determination whether the first data packet is unicast may be based on an individual/group (I/G) bit which identifies whether a packet is unicast or multicast/broadcast. For example, the VG bit (e.g., the least significant bit of the most significant byte of a MAC address) may be set to 1 when the packet is multicast or broadcast and may be set to 0 when the packet is unicast.

If, at 315, the determination is made that the first data packet is not a unicast packet, the determination may be made that the first data packet is a multicast or broadcast packet, and the process 300 may proceed to 320. At 320, the first data packet may be replicated to create a second data packet. The first packet may be replicated, for example, by the WAN interface 205. In embodiments, a first data packet that is broadcast or multicast may be replicated to create a second data packet so that the packet may be delivered to an intended destination through both a route and a bridge routine.

At 325, the second data packet may be set to be bridged. The second data packet may be set to be bridged, for example, by the WAN interface 205. For example, the second data packet may be passed through a bridging module 215 of FIG. 2. In embodiments, the bridging module 215 may recognize the second data packet as being set to be bridged and may bridge the second data packet to a LAN interface 225 of FIG. 2 or host device 125.

At 330, the first data packet may be set to be routed. The first data packet may be set to be routed, for example, by the WAN interface 205. For example, the first data packet may be passed through a routing module 220 of FIG. 2. In embodiments, a bridging module 215 may ignore the first data packet (e.g., since the packet is not set to be bridged), and the packet may arrive at the routing module 220. The routing module 220 may recognize the first data packet as being set to be routed and may route the first data packet to a LAN interface 225 or host device 125.

Returning to 315, if the determination is made that the first data packet is a unicast packet, the process 300 may proceed to 335. At 335, a determination may be made whether the identified destination of the first data packet is the WAN interface. The determination whether the identified destination of the first data packet is the WAN interface may be made, for example, by the WAN interface 205. In embodiments, if the destination address (e.g., MAC address) matches a unique identifier (e.g., MAC address) associated with the WAN interface 205, then the WAN interface 205 may determine that the packet is to be routed to a host device 125.

If, at 335, the determination is made that the destination address of the first data packet matches that of the WAN interface, the first data packet may be set to be routed at 330. For example, the first data packet may be passed through a routing module 220 of FIG. 2. In embodiments, a bridging module 215 may ignore the first data packet (e.g., since the packet is not set to be bridged), and the packet may arrive at the routing module 220. The routing module 220 may recognize the first data packet as being set to be routed and may route the first data packet to a LAN interface 225 or host device 125.

If, at 335, the determination is made that the destination address of the first data packet does not match that of the WAN interface, the first data packet may be set to be bridged at 340. For example, the first data packet may be passed through a bridging module 215 of FIG. 2. In embodiments, the bridging module 215 may recognize the first data packet as being set to be bridged and may bridge the second data packet to a LAN interface 225 of FIG. 2 or host device 125.

At 345, data packet(s) may be output according to a routing or bridging setting. The data packet(s) may be processed at the access point 105 by either a bridging module 215 of FIG. 2 or a routing module 220 of FIG. 2 and may be output, for example, through a LAN interface 225 of FIG. 2 to one or more targeted host devices 125. In embodiments, the data packet(s) may be processed by either a bridging module 215 or routing module 220 based upon whether the data packet(s) are set to be bridged or routed. For example, packet(s) set to be bridged may be processed by the bridging module 215 and packet(s) set to be routed may be processed by the routing module 220. A bridged packet may be passed from a WAN interface of the access point 105 to a LAN interface of the access point 105 at the link layer (e.g., layer 2) without translating a source or destination address. A routed packet may be routed from the WAN interface of the access point 105 to the LAN interface of the access point 105 at the network layer (e.g., layer 3, IP). For example, NAT may be applied to a routed downstream packet.

Figure 4:
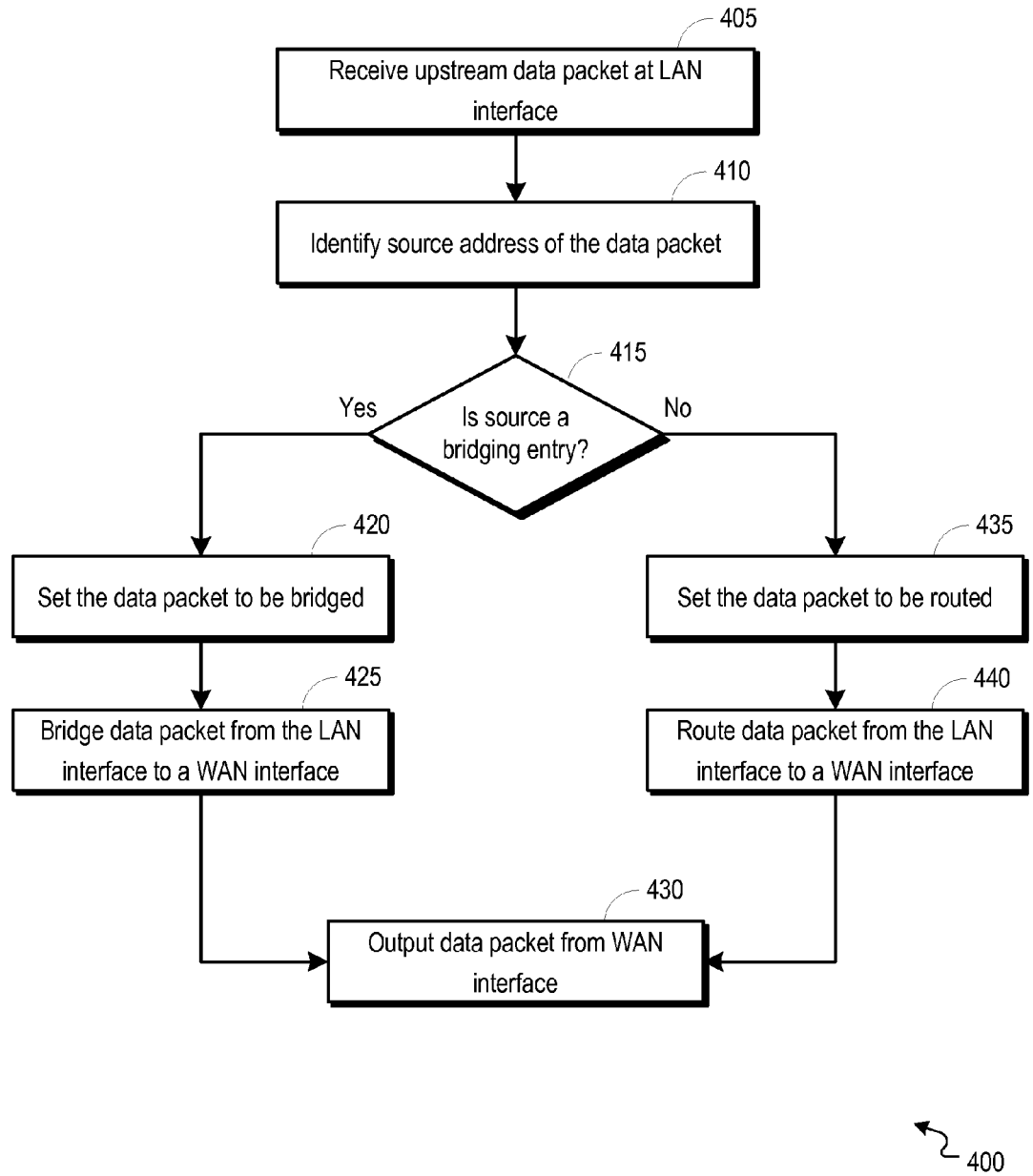
FIG. 4 is a flowchart illustrating an example process operable to facilitate bridging of upstream data packets based upon an identification of a packet source.

FIG. 4 is a flowchart illustrating an example process 400 operable to facilitate bridging of upstream data packets based upon an identification of a packet source. The process 400 may begin at 405 when an upstream data packet is received at a local area network (LAN) interface. The upstream data packet may be received by a LAN interface 225 of FIG. 2 of an access point 105 of FIG. 1. For example, the upstream data packet may be received at an access point 105 from a host device 125 of FIG. 1 through a local network 120 of FIG. 1.

At 410, a source address of the data packet may be identified. The source address of the data packet may be identified, for example, by the LAN interface 225. In embodiments, the data packet may include a source address associated with a host device 125 from which the packet was output. For example, the address may be a media access control (MAC) address associated with the host device 125.

At 415, a determination may be made whether the identified source address is associated with a bridging entry. The determination whether the identified source address is associated with a bridging entity may be made, for example, by the LAN interface 225. In embodiments the LAN interface 225 may compare the identified source address to one or more source addresses that are associated with bridging entities. For example, the source addresses (e.g., MAC addresses) for host devices 125 configured to receive and transmit communications (i.e., packets) via bridging may be stored within a database at an associated access point 105 (e.g., bridging entry database 210 of FIG. 2).

If, at 415, the determination is made that the identified source address is associated with a bridging entry, the process 400 may proceed to 420. At 420, the data packet may be set to be bridged. For example, the data packet may be passed through a bridging module 215 of FIG. 2. In embodiments, the bridging module 215 may recognize the data packet as being set to be bridged.

At 425, the data packet may be bridged from the LAN interface to a WAN interface. In embodiments, the data packet may be processed by a bridging module 215 of FIG. 2 and may be forwarded to a WAN interface 205 of FIG. 2. For example, the data packet may be bridged from the LAN interface of the access point 105 to a WAN interface of the access point 105 at the link layer (e.g., layer 2) without translating a source or destination address The bridged data packet may be output from the WAN interface 205 towards a destination element at 430.

Returning to 415, if the determination is made that the identified source address is not associated with a bridging entry, the process 400 may proceed to 435. At 435, the data packet may be set to be routed. For example, the data packet may be passed through a routing module 220 of FIG. 2. In embodiments, a bridging module 215 may ignore the data packet (e.g., since the packet is not set to be bridged), and the packet may arrive at the routing module 220. The routing module 220 may recognize the data packet as being set to be routed and may route the data packet.

At 440, the data packet may be routed from the LAN interface to a WAN interface. In embodiments, the data packet may be processed by a routing module 220 of FIG. 2 and may be forwarded to a WAN interface 205 of FIG. 2. For example, the data packet may be routed from the LAN interface of the access point 105 to the WAN interface of the access point 105 at the network layer (e.g., layer 3, IP). Routing of the data packet may include a translation (e.g., NAT) of the source address associated with the data packet from the source address of the host device 125 to a source address associated with the access point 105. The routed data packet may be output from the WAN interface 205 towards a destination element at 430.

Figure 5:
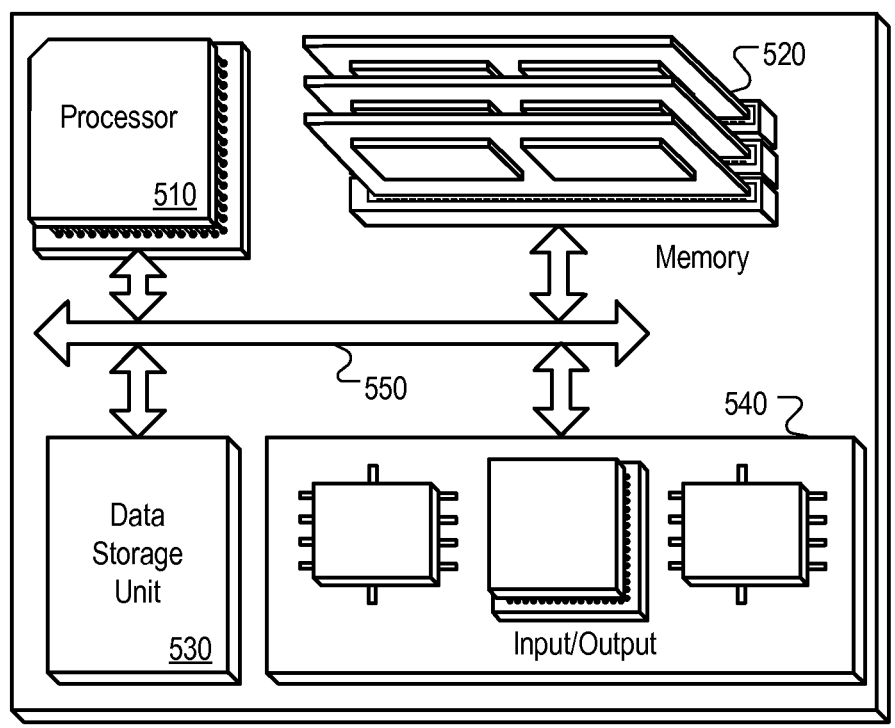
FIG. 5 is a block diagram of a hardware configuration operable to facilitate packet bridging based upon a device address.

FIG. 5 is a block diagram of a hardware configuration 500 operable to facilitate packet bridging based upon a device address. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting voice, video, and/or data services to a host device 125 of FIG. 1 (e.g., STB, television, computer, tablet, mobile device, etc.). In embodiments, the input/output device can include driver devices configured to send communications to, and receive communications from one or more networks (e.g., local network 120 of FIG. 1, provider network 115 of FIG. 1, WAN 110 of FIG. 1, etc.).

Those skilled in the art will appreciate that the invention improves upon methods and systems for bridging data packets received at an access point. Methods, systems, and computer readable media can be operable to facilitate packet bridging based upon a host device address. An access point may identify a source or destination address associated with a received packet, wherein the address identifies an associated host device. When the destination address of a downstream data packet matches an address associated with the access point, the access point may route the packet to a destination within a local area network (LAN). When the source address of an upstream data packet identifies a host device for which communications are to be bridged, the access point may bridge the data packet to a wide area network (WAN). An access point may identify a multicast or broadcast downstream data packet and the access point may flood the packet to both a route and a bridge routine. The bridging determination may be made by a dual-layer WAN or LAN interface.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
receiving a downstream data packet at a first interface of an access point;
identifying a destination address from the downstream data packet, wherein the destination address identifies a destination of the downstream data packet, and wherein the destination address comprises a media access control (MAC) address associated with the destination of the downstream data packet;
comparing the destination address to a media access control (MAC) address associated with the first interface of the access point; and
based upon the comparison between the media access control (MAC) address associated with the destination of the downstream data packet and the media access control (MAC) address associated with the first interface of the access point, determining whether to route or bridge the downstream data packet from the first interface of the access point to a second interface of the access point, wherein the determination whether to route or bridge the downstream data packet comprises:
if the destination address matches the address associated with the first interface of the access point, routing the downstream data packet from the first interface of the access point to the second interface of the access point; and
if the destination address does not match the address associated with the first interface of the access point, bridging the downstream data packet from the first interface of the access point to the second interface of the access point, wherein bridging the downstream data packet comprises passing the downstream data packet from the first interface of the access point to the second interface of the access point without translating the destination address associated with the downstream data packet.

2. The method of claim 1, further comprising:
based on the identified destination address, determining that the downstream data packet is associated with a plurality of destinations;
replicating the downstream data packet to create a replicate data packet;
bridging the replicate data packet from the first interface of the access point to the second interface of the access point; and
routing the downstream data packet from the first interface of the access point to the second interface of the access point.

3. The method of claim 1, wherein the first interface comprises a link layer interface and a network layer interface.

4. A method comprising:
receiving an upstream data packet at a first interface of an access point;
identifying a source address from the upstream data packet, wherein the source address identifies a host device from which the upstream data packet is output;
comparing the source address to one or more bridging addresses, wherein each respective one of the one or more bridging addresses comprises an address associated with a device for which packet bridging is enabled, wherein each device for which packet bridging is enabled comprises a device that is external to the access point, and wherein each respective one of the one or more bridging addresses comprises an address associated with a corresponding device for which an indication of a current status of the corresponding device is stored within a database, the indication of the current status comprising an indication of whether bridging is enabled or disabled for the corresponding device; and determining whether to route or bridge the upstream data packet from the first interface of the access point to a second interface of the access point, wherein the determination whether to route or bridge the upstream data packet comprises:

if the source address matches at least one of the bridging addresses, bridging the upstream data packet from the first interface of the access point to the second interface of the access point, wherein bridging the upstream data packet comprises passing the upstream data packet from the first interface of the access point to the second interface of the access point without translating the source address associated with the upstream data packet; and if the source address does not match at least one of the bridging addresses, routing the upstream data packet from the first interface of the access point to the second interface of the access point, wherein routing the upstream data packet comprises modifying network address information of the upstream data packet by replacing an Internet protocol (IP) address associated with the host device with an IP address associated with the access point.

5. The method of claim 4, wherein each respective one of the one or more bridging addresses comprises a media access control (MAC) address associated with a device for which packet bridging is enabled.

6. The method of claim 4, wherein the source address comprises a media access control (MAC) address associated with the host device from which the upstream data packet is output.

7. The method of claim 4, wherein the first interface comprises a link layer interface and a network layer interface.

8. An apparatus comprising:
a first interface configured to be used to receive a downstream data packet; and
a second interface configured to be used to receive an upstream data packet;
wherein the first interface is further configured to be used to:
identify a destination address from the downstream data packet, wherein the destination address identifies a destination of the downstream data packet;
compare the destination address to an address associated with the first interface;
determine whether to route or bridge the downstream data packet from the first interface of the access point to a second interface of the access point, wherein the determination whether to route or bridge the downstream data packet comprises:
route the downstream data packet to a second interface if the destination address matches the address associated with the first interface; and
bridge the downstream data packet to a second interface if the destination address does not match the address associated with the first interface, wherein bridging the downstream data packet comprises passing the downstream data packet from the first interface of the access point to the second interface of the access point without translating the destination address associated with the downstream data packet; and
wherein the second interface is further configured to be used to:
identify a source address from the upstream data packet, wherein the source address identifies a host device from which the upstream data packet is output;
compare the source address to one or more bridging addresses, wherein each respective one of the one or more bridging addresses comprises an address associated with a device for which packet bridging is enabled;
determine whether to route or bridge the upstream data packet to the first interface of the access point, wherein the determination whether to route or bridge the upstream data packet comprises:
bridge the upstream data packet to the first interface if the source address matches at least one of the bridging addresses; and
route the upstream data packet to the first interface if the source address does not match at least one of the bridging addresses.

9. The apparatus of claim 8, wherein the address associated with the first interface comprises a media access control (MAC) address.

10. The apparatus of claim 8, wherein the destination address comprises a media access control (MAC) address associated with the destination of the downstream data packet.

11. The apparatus of claim 8, wherein the first interface comprises a wide area network (WAN) interface and the second interface comprises a local area network (LAN) interface.

12. The apparatus of claim 8, wherein each respective one of the one or more bridging addresses comprises a media access control (MAC) address associated with a device for which packet bridging at the access point is enabled.

13. The apparatus of claim 8, wherein the source address comprises a media access control (MAC) address associated with the host device from which the upstream data packet is output.

14. The apparatus of claim 8, wherein each respective one of the first interface and the second interface comprises a link layer interface and a network layer interface.

* * * * *